United States Patent [19]

Tsutsumi

[11] Patent Number: 5,375,989

[45] Date of Patent: Dec. 27, 1994

[54] APPARATUS FOR PLASTIC ENCAPSULATION OF A SEMICONDUCTOR ELEMENT

[75] Inventor: Yasutsugu Tsutsumi, Fukuoka, Japan

[73] Assignee: Mitsubishi Denki Kabushiki Kaisha, Tokyo, Japan

[21] Appl. No.: 69,669

[22] Filed: Jun. 1, 1993

Related U.S. Application Data

[63] Continuation of Ser. No. 732,178, Jul. 18, 1991, abandoned.

[30] Foreign Application Priority Data

Jul. 24, 1990 [JP] Japan ............................... 2-196946

[51] Int. Cl.⁵ ................. B29C 45/40; B29C 45/64
[52] U.S. Cl. ................. 425/127; 425/129.1; 425/556; 425/590
[58] Field of Search ............ 425/556, 589, 127, 129.1, 425/590

[56] References Cited

U.S. PATENT DOCUMENTS

| | | | |
|---|---|---|---|
| 3,156,014 | 11/1964 | Wenger | 425/589 |
| 3,669,598 | 6/1972 | Tucker | 425/556 |
| 4,231,987 | 11/1980 | Osawa et al. | 425/556 |
| 4,915,608 | 4/1990 | Tsutsumi et al. | 425/121 |
| 5,074,779 | 12/1991 | Tsutsumi et al. | 425/444 |

FOREIGN PATENT DOCUMENTS 110124 6/1984 Japan.
191013 12/1988 Japan.

*Primary Examiner*—Tim Heitbrink
*Attorney, Agent, or Firm*—Leydig, Voit & Mayer

[57] ABSTRACT

A plastic molding device for plastic molding a semiconductor element includes upper mold and lower molds, each mold having a plurality of cavities, injection passages for injecting plastic into the cavities, and eject pins for ejecting plastic molded semiconductor elements from the cavities; a plastic injecting mechanism for injecting plastic into the cavities; and a mold driving mechanism for driving the upper or lower molds to join and separate them. The plastic molding device further includes a pin driver for projecting the eject pin after injection of the plastic into the cavities is completed while the upper and lower molds are together. Therefore, shrinkage deformation on a surface of the plastic molded product is prevented, whereby a plastic molded semiconductor device having a smooth surface is produced.

3 Claims, 4 Drawing Sheets

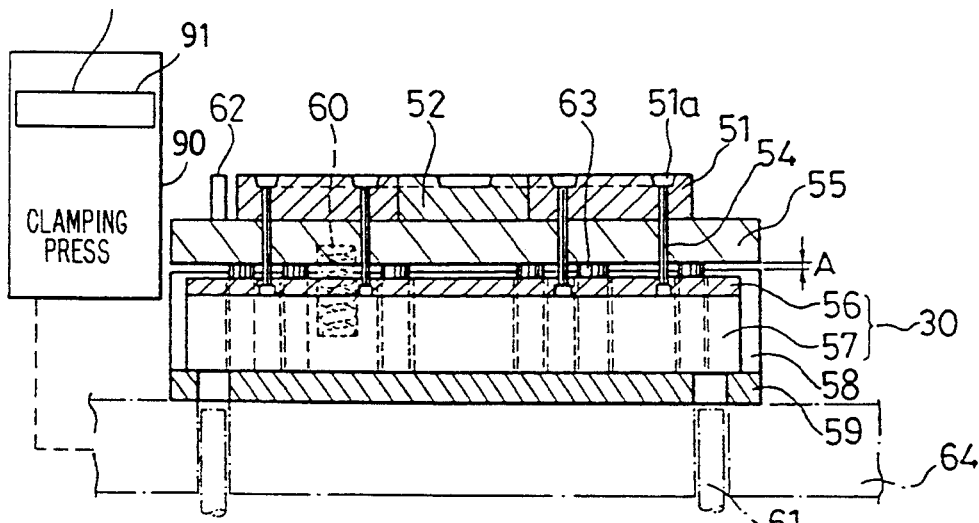
FIG. 3
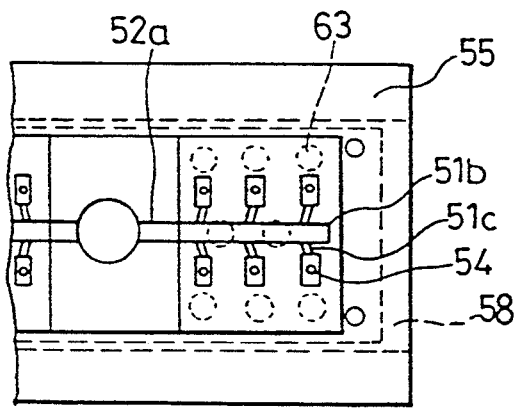
FIG. 4
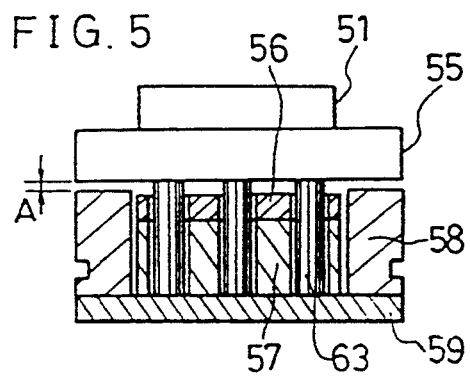
FIG. 5
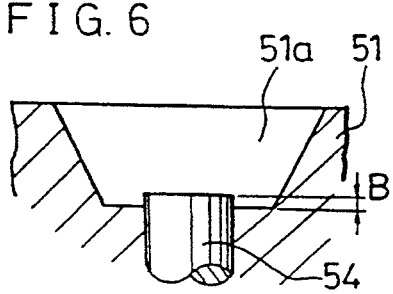
FIG. 6
FIG. 7

APPARATUS FOR PLASTIC ENCAPSULATION OF A SEMICONDUCTOR ELEMENT

This application is a continuation of application Ser. No. 07/732,178, filed Jul. 18, 1991 now abandoned.

FIELD OF THE INVENTION

The present invention relates to an improvement of a plastic molding device for a semiconductor element and a method for plastic molding a semiconductor element.

BACKGROUND OF THE INVENTION

FIG. 8 is a view showing a conventional plastic molding device for plastic molding a semiconductor element.

In FIG. 8, reference numeral 80 designates a plastic molding means for plastic molding a semiconductor element, which comprises separable upper mold 70 and lower mold 71. The upper and lower molds 70 and 71 are supported by upper and lower platens 65 and 64 of a clamping press (a mold driving mechanism) which is not shown, respectively.

The upper mold 70 comprises an upper mold cavity block 1 having a plurality of upper mold cavities 1a, an upper surface plate 5 with a heater built therein which supports the upper block 1, a base plate 9 supporting the upper surface plate 5 through a post 15, and a spacer block 8 interposed between the upper surface plate 5 and the base plate 9. The upper cavity block 1 has a center block 2 in the center thereof and the center block 2 is equipped with a chamber 3 for housing a plastic tablet 14. At an upper portion of the chamber 3 a plunger 12 is provided for pressing the plastic tablet 14. In addition, an eject pin 4, one end of which is drawn in or out of the upper cavity 1a is provided in the cavity block 1 and the upper surface plate 5. Vertically movable pin supporting member 20 comprising an ejector plate 7 and a keep plate 6 which pushes the eject pin 4 toward the side of the ejector plate 7 is provided between the upper surface plate 5 and the base plate 9 in the upper mold 70. The pin supporting member 20 is urged against the upper surface plate 5 by forcing means 21. The forcing means 21 comprises a screw bar 10 screwed on the upper surface plate 5 and a spring 11 provided between the screw bar 10 and the pin supporting member 20. Reference numeral 13 designates a return pin fixed on the pin supporting member 20.

The lower mold 71 has the almost same structure as that of the upper mold 70, which comprises a lower mold cavity block 51 having a plurality of lower mold cavities 51a, a lower center block 52 at the center thereof, a lower surface plate 55 with a heater built therein which supports the blocks 51 and 52, a post 63 supporting the lower surface plate 55, a spacer block 58, and a base plate 59. Eject pins 54, one end of each of which can be drawn in and out of the lower mold cavity 51a, are provided in the cavity block 51 and the lower surface plate 55. A vertically movable pin supporting member 30 comprising an ejector plate 57 and a keep plate 56 is provided between the lower surface plate 55 and the base plate 59. The pin supporting member 30 is urged away from the lower surface plate 55 by a spring 60.

In the lower center block 52 and the lower mold cavity block 51 runners 52a and 51b are respectively formed as passages for the plastic 14. In addition, in the block 51 a gate 51c connecting the runner 51b to the lower mold cavity 51a is formed. The runner 52a and the gate 51c form a plastic injecting mechanism with the plunger 12 and the chamber 3. In addition, a return stopper 62 is attached to the lower surface plate 55. This return stopper 62 abuts the return pin 13 at the time of clamping to retract the eject pin 4 of the upper mold 70. A knockout rod 61 is fixed on the base part of the device. This knockout rod 61 abuts the pin supporting member 30 to eject the eject pin 54 into the lower mold cavity 51a when the upper and lower molds 70 and 71 are separated by moving the lower platen 64 downward. Further, a plurality of posts are provided in this device other than the above posts 15 and 63.

Next, the operation of the apparatus of FIG. 8 will be described.

A lead frame on which semiconductor chips are bonded is set on the lower cavity block 51. These chips are connected to the lead frame by metal wires. Then, the lower mold 71 is moved upward by the clamping press and put together with the upper mold 70 and then they are clamped. At this time, since the return stopper 62 pushes the return pin 13, the pin supporting member 20 slightly moves upward against the force of the spring 11, whereby the eject pins 54 are retracted from the upper mold cavity 1a.

Then, the plastic 14 which is preheated is put in the chamber 3 and the plunger 12 is moved downward to apply pressure to the plastic 14. Then, the plastic 14 passes through the runners 52a and 51b and then the gate 51c, and fills the cavities 1a and 51a.

In this state, the plastic is left for 60 to 90 seconds to solidify and then the lower mold 71 is moved down to open the plastic molding means 80. At this time, the return stopper 62 is separated from the return pin 13, whereby the pin supporting member 20 is moved downward by the force of the spring 11. Then, the upper mold eject pins 4 push plastic molded products out from the upper mold cavities 1a. Thereafter, the lower platen 64 of the clamping press falls and the knockout rod 61 abuts the bottom of the supporting member 30. Then, the pin supporting member 30 is pushed by the rod 61 and rises relative to the lower surface plate 55. Then, the eject pins 54 project into the lower cavities 51a and push the products out. The plastic molded products are picked up and then go through the process of cutting and bending the leads, completing plastic molded semiconductor devices.

In the conventional plastic molding device constituted as described above, the plastic is injected by the plastic injecting mechanism, but sufficient injection pressure does not reach the cavity because of the pressure loss in the runners 52a and 51b and the gate 51c or the like. Further, since the sectional area of the gate 51c is small as compared with that of other passages such as the runner, the plastics are likely to thermally harden there. When the plastic solidifies in this portion, the injection pressure does not reach the cavity at all. Accordingly, shrinkage deformation or the like occurs on the surface of the plastic molded product molded in the cavity causing the quality of the package to degrade. Particularly, in an optical semiconductor element for processing an optical signal, which is molded in transparent plastic, signal light reflects or refracts because of unevenness of the package surface, causing erroneous operation.

In order to solve the problem of shrinkage deformation in general plastic molding, there is proposed a device disclosed in Japanese Utility Model Laid-Open Application No. 63-191013, in which a cylinder and a piston are arranged corresponding to a thick portion of the molded product and pressure is applied to the plastic by actuating the piston after the plastic is injected. However, since there are many small cavities in the plastic molding device for a semiconductor element, it is actually impossible to arrange a cylinder and piston for each cavity, so that the problem of shrinkage deformation in plastic molding for the semiconductor element can not be solved.

SUMMARY OF THE INVENTION

The present invention was made to solve the above problems and it is an object of the present invention to provide a plastic molding device for a semiconductor element preventing shrinkage deformation or the like on a surface of a plastic molded product and thus producing a plastic molded semiconductor element which has a smooth surface.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a plastic molding device for a semiconductor element in accordance with the present invention, there is provided driving means for projecting an eject pin into a cavity when the upper and lower molds are put together after plastic is injected into the cavity, whereby the plastic, just before solidification in each cavity is directly pressurized. Thus, the generation of shrinkage deformation due to molding shrinkage of the plastic is prevented, whereby a plastic package having a smooth surface can be obtained. Particularly, in an optical device an optical characteristic of the plastic package can be improved, so that a high quality package can be obtained.

BRIEF DESCRIPTION OF THE DRAWINGS

FIG. 3 is a sectional view showing a plastic molding device in accordance with a third embodiment of the present invention;

FIG. 4 is a plan view showing the plastic molding device of FIG. 3;

FIG. 5 is a side sectional view showing the plastic molding device of FIG. 3;

FIG. 6 is a view showing an eject pin which protrudes into a cavity;

FIG. 7 is a view showing the positional relation between a metal wire and the eject pin;

DETAILED DESCRIPTION OF THE PREFERRED EMBODIMENTS

Embodiments of the present invention will be described in reference to the drawings hereinafter.

Figure 1:
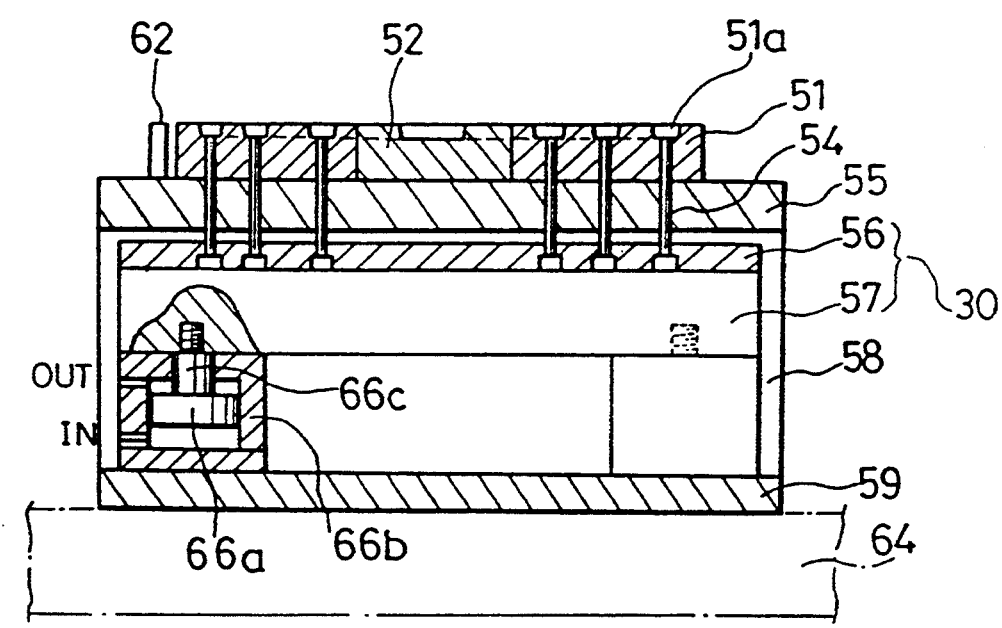
FIG. 1 is a sectional view showing a plastic molding device for a semiconductor device in accordance with a first embodiment of the present invention.

FIG. 1 is a sectional view showing a plastic molding device for encapsulating a semiconductor device in accordance with a first embodiment of the present invention.

Figure 8:
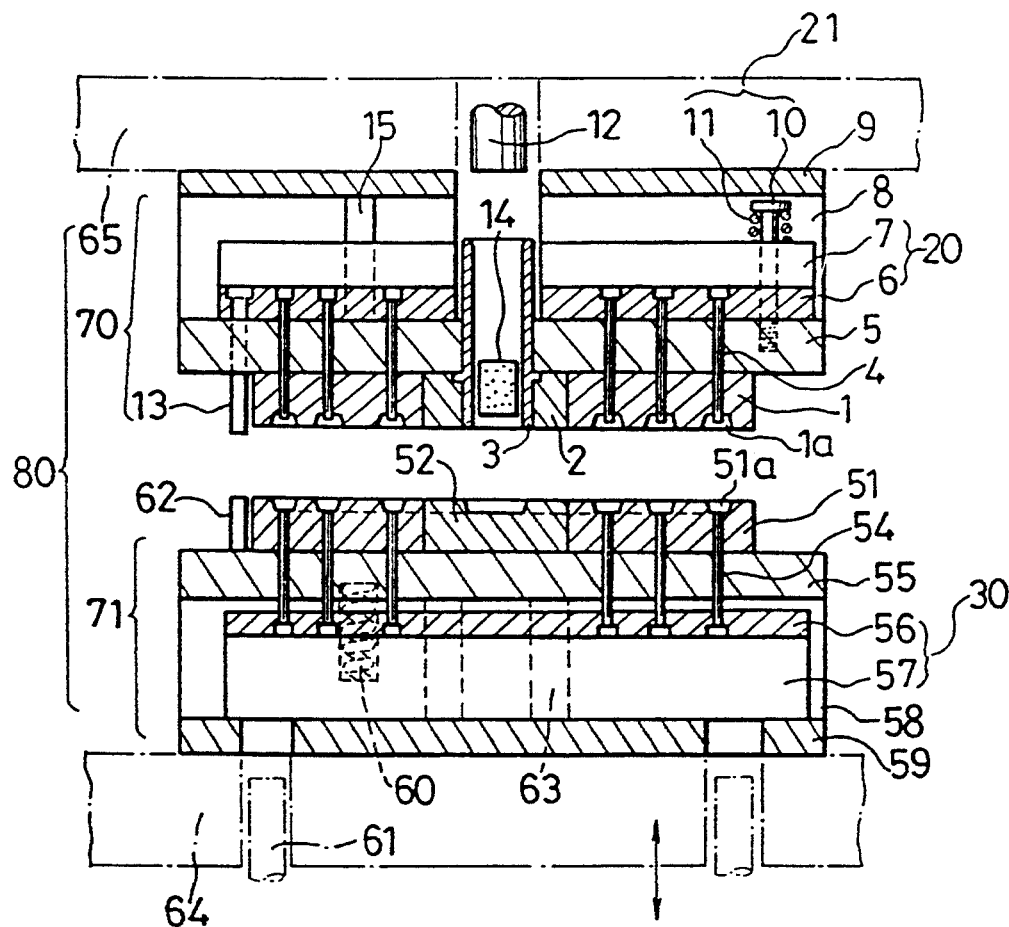
FIG. 8 is a sectional view showing a conventional plastic molding device for encapsulating a semiconductor element.
Figure 9:
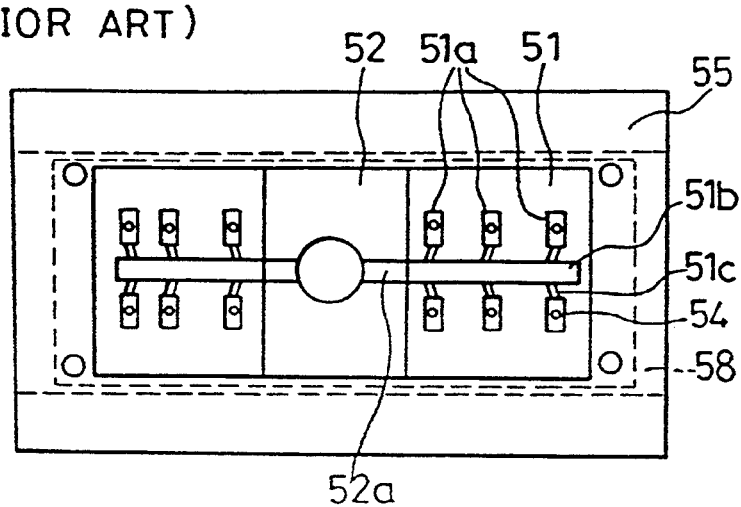
FIG. 9 is the plan view showing a surface of a lower mold of the plastic molding device of FIG. 8.

In FIG. 1, since the same reference numerals as in FIG. 8 designate the same or corresponding parts, description thereof will be omitted. A cylinder 66b for pressurization having a piston 66a is provided between the base plate 59 and the ejector plate 57 in the lower mold 71 and a piston rod 66c of the piston 66a is connected to the ejector plate 57, whereby pin driving means (a pressurizing cylinder mechanism) for driving the eject pin 54 is provided. Further, the pressurizing cylinder mechanism works just before the plastic 14 in the cavities 1a and 51a is solidified and also it works when the product is ejected. An amount of protrusion of the eject pin 54 just before the plastic is solidified is set at a value B corresponding to the molding shrinkage as shown in FIG. 6.

Further, the pressurizing cylinder mechanism drives the ejector plate 57 upward (toward the cavity side) when working fluid enters the IN side, i.e., enters into a chamber on the upper side of the piston, and drives it toward the base plate 59 when the fluid enters the OUT side, i.e., enters into the chamber on lower side of the piston 66a. Therefore, there is not provided the spring 60 which urges the pin supporting member 30 toward the base plate 59. Still further, according to this embodiment of the present invention, since the product can be ejected by the pressurizing cylinder mechanism, the knockout rod 61 provided in the conventional device is not provided in order to simplify the structure.

Next, operation thereof will be described.

Clamping is performed and then the plastic 14 is pressurized by the plunger 12 to start the injection of the plastic 14. The injected plastic 14 passes through the runners 51b and 52a and the gate 51c and is injected into the cavities 1a and 51a. The working fluid is pressurized at the IN side of the cylinder 66c to drive the piston 66a upward 2 to 5 seconds after the injection of the plastic 14 is completed, that is, in a state where the plastic 14 in the gate 51c is slightly solidified and in the cavities 1a and 51a is not yet solidified. Then, the ejector plate 57 moves upward and the plastic in the cavities 1a and 51a is pressurized by the eject pin 54. Thus, the plastic 14 is solidified without shrinking.

Thereafter, the eject pin 54 is slightly retracted to relieve the pressure on the plastic 14, and the lower mold 71 is moved downward to open the plastic molding means 80. Then, the ejector plate 57 is driven by the above driving mechanism to extend the eject pin 54 into the cavity 51a, whereby the plastic molded product is ejected.

As described above, according to the first embodiment of a present invention, there is provided the pressurizing cylinder mechanism between the base plate 59 and the ejector plate 57 in the lower mold 71, whereby the plastic 14 in each cavity 51a is pressurized by the eject pin 54 just before it is solidified. Thus, shrinkage deformation due to molding shrinkage of plastic 14 is prevented and a smooth surface package without shrinkage deformation is obtained. Particularly, in a plastic molded optical device, the optical characteristics of the package are improved.

In addition, since the pressurizing cylinder mechanism is provided on the lower mold 71 to drive the eject pin 54 on the lower mold cavity block 51, the eject pin 54 protrudes toward the lower surface of the lead frame 67 where the metal wirings 68 are not present. Thus, the metal wires 68 are not deformed and short circuits between an element surface and the metal wires 68 are prevented. Further, since the pressurizing cylinder mechanism is built in the lower mold 71, a conventional press can be used.

Further, although the pressurizing cylinder mechanism drives the eject pin 54 when the product is ejected and also drives the eject pin 54 when the plastic 14 is pressurized in the above first embodiment, the ejection of the product and the pressurization of the plastic 14 can be performed by separate pressurizing mechanisms.

Still further, although the pressurizing cylinder mechanism is built in the lower mold 71 in the above first embodiment, the pressurizing cylinder mechanism can be built in the upper mold 70 or it can be built in both upper and lower molds. Alternatively, the pressurizing cylinder mechanism can be arranged on the lower surface of the lower platen 64 of the clamping press.

Figure 2:
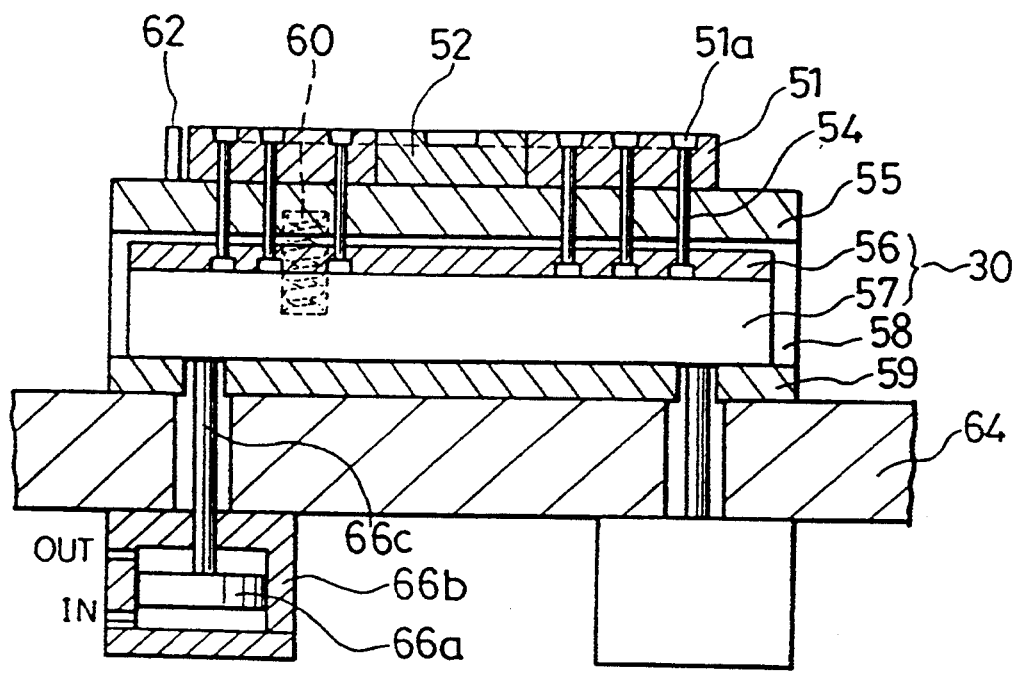
FIG. 2 is a sectional view showing a plastic molding device in accordance with a second embodiment of the present invention.

FIG. 2 is a sectional view showing a plastic molding device in accordance with a second embodiment of the present invention. In this device, the pressurizing cylinder mechanism is provided on a lower surface of the lower platen 64 of the clamping press and the cylinder rod 66c for pressurization penetrates the lower platen 64 to abut the lower surface of the pin supporting member 30. The pin supporting member 30 is urged toward the base plate 59 by the spring 60. Other aspects are the same as in the first embodiment of the present invention.

According to this second embodiment, since the pressurizing cylinder mechanism is arranged on the lower surface of the lower platen 64 of the clamping press, the structure of the lower mold 71 can be used without any change.

FIGS. 3 to 5 are views showing a plastic molding device in accordance with a third embodiment of the present invention. In this device, the pressurizing cylinder mechanism as a driving source is not used unlike the above embodiments and the plastic 14 just before solidification is pressurized by using elastic deformation of a part forming the lower mold 71.

More specifically, in this third embodiment, a plurality of posts 63 which penetrate the keep plate 56 and the ejector plate 57 of the pin supporting member 30 are provided between the base plate 59 and the lower surface plate 55 to maintain a space A between the spacer block 58 and the lower surface plate 55. Thus, the lower surface plate 55 is supported on the base plate 59 by these posts 63 only. Further, a controlling means 91 for controlling the clamping force is provided in a clamping press 90, whereby the clamping force, i.e., the compressive force between the lower platen 64 and the upper platen 65 has variations of two stages, i.e., at the time of clamping and at the time of pressurizing the plastic.

In this case, an amount of protrusion B of the eject pin 54 is set as follows.

The amounts of compressive deformation $\delta_1$ and $\delta_2$ of the post by the first and second clamping force $P_1$ and $P_2$ are represented as follows:

$$\delta_1 = \frac{P_1 l}{AE}, \delta_2 = \frac{P_2 l}{AE}$$

where $P_1$ the first clamping force at the time of clamping, $P_2 (>P_1)$ is the second clamping force at the time of pressurization, A is the cross sectional area of posts, l is the length of the posts, and E is the Young's modulus of the posts. Then, the amount of protrusion B of the eject pin is represented by the following equation:

$$B = \delta_2 - \delta_1$$

FIG. 4 is a plan view of FIG. 3, which shows arrangement of the post 63. FIG. 5 is a side sectional view of FIG. 3.

Next, operation thereof will be described.

First clamping is performed by the first clamping force $P_1$. At this time, the eject pin 54 is at the position shown by a solid line in FIG. 7. Then, the plastic 14 is injected into the cavity and second clamping is performed by the second clamping force $P_2$ just before the solidification of the plastic, whereby the eject pin projects to the position shown by a dotted line in FIG. 7. Thus, the plastic 14 is pressurized and solidified without any molding shrinkage. After the plastic 14 is solidified, the lower platen 64 is lowered. When the pin supporting member 30 abuts the knockout rod 61, the pin supporting member 30 rises relative to the lower surface plate 55 to protect the eject pin 54. Then, the product is ejected.

According to the third embodiment of the present invention, since the plastic 14 in the cavity 51a is pressurized by the elastic deformation of the post 63 caused by the clamping force, a pressurizing cylinder mechanism as a driving source is not necessary, providing an inexpensive plastic molding device for a semiconductor element.

Further, while in the above third embodiment the pressurizing mechanism using elastic deformation is built in the lower mold 71, this can be built in the upper mold 70 or built in both lower and upper molds 71 and 70.

As described above, according to the plastic molding device for a semiconductor element of the present invention, there is provided a driving means for projecting the eject pin into the cavity and the plastic in each cavity just before solidification is directly pressurized when the upper and lower molds are put together after injection of the plastic into the cavity is completed. Thus, shrinkage deformation or the like on a surface of the plastic molded product is prevented, whereby a plastic molded semiconductor element having a smooth surface is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A molding apparatus for encapsulating a semiconductor element in plastic comprising:
    a first mold comprising a first cavity block including a first mold cavity, an eject pin having an end movable into and out of the first mold cavity, a surface plate supporting the first cavity block, a base plate spaced from the surface plate, a pin support member movably disposed between the base plate and the surface plate and connected to the eject pin, and an elastic support disposed between the base plate and the surface plate;

a second mold having a second mold cavity;

plastic injecting means for injecting plastic into the first and second mold cavities; and mold driving means for joining the first and second molds with a first compressive joining force prior to injection of the plastic into the first and second mold cavities and increasing the compressive joining force from the first compressive joining force to a second compressive joining force, greater than the first compressive joining force, after injection of the plastic into the first and second mold cavities, the first and second compressive joining forces being exerted through the base plate, the second compressive joining force being large enough to compress the elastic support to drive the end of the eject pin into the first mold cavity.

2. The molding apparatus in accordance with claim 1 wherein the second compressive joining force is large enough to drive the end of the eject pin into the first mold cavity a distance corresponding to shrinkage of plastic solidified in the first mold cavity after injection of plastic into the first mold cavity.

3. A molding apparatus for encapsulating a semiconductor element in plastic comprising:

a first mold having a first mold cavity;

a second mold contacting the first mold and having a second mold cavity joined to the first mold cavity;

mold driving means for joining and separating the first and second molds;

an eject pin movably supported by the first mold and having an end extending into the first mold cavity;

a pin driving mechanism drivingly connected to the eject pin and exerting a drive force on the eject pin and driving the end of the eject pin into the first mold cavity with the first and second molds joined; and plastic injecting means for injecting plastic into the first and second mold cavities wherein the pin driving mechanism exerts the drive force on the eject pin two to five seconds after completion of the injection of plastic by the plastic injecting means.

* * * * *